US006980889B2

(12) United States Patent
Ito

(10) Patent No.: US 6,980,889 B2
(45) Date of Patent: Dec. 27, 2005

(54) INFORMATION PROCESSING APPARATUS AND METHOD, PROGRAM STORAGE MEDIUM, AND PROGRAM

(75) Inventor: Masato Ito, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/959,557

(22) Filed: Oct. 6, 2004

(65) Prior Publication Data

US 2005/0080513 A1   Apr. 14, 2005

(30) Foreign Application Priority Data

Oct. 8, 2003 (JP) ............................ P2003-349029

(51) Int. Cl.[7] ............................................. G06F 19/00
(52) U.S. Cl. ..................... 700/245; 700/246; 700/251; 700/253; 700/260; 700/261; 180/8.1; 180/8.6; 318/568.1; 318/568.12; 318/568.16; 318/568.17; 318/568.2; 901/1; 901/9; 901/46
(58) Field of Search ............................... 700/245–246, 700/251, 253, 260–261; 180/8.1, 8.6; 318/568.1, 318/568.12, 568.16, 568.17, 568.2; 901/1, 901/9, 46

(56) References Cited

U.S. PATENT DOCUMENTS

| 6,580,969 B1 * | 6/2003 | Ishida et al. ................. 700/245 |
| 2002/0109606 A1 * | 8/2002 | Yamaguchi ............ 340/825.69 |
| 2004/0167759 A1 * | 8/2004 | Kawakami ..................... 703/6 |

OTHER PUBLICATIONS

Hiarai et al., The development of Honda humanoid robot, 1998, IEEE, pp. 1321-1326.*
Huang et al., Planning walking pattersns for a biped robot, 2001, IEEE, pp. 280-289.*
Li et al., Learning conrol for a biped walking robot with a truk, 1993, IEEE, pp. 1771-1777.*
Lim et al., Control to realize human-like walking of a biped humanoid robot, 2000, IEEE, pp. 3271-3276.*
Yamaguchi et al., Development of a bipedal humanoid robot—Control method of hole body cooperative dynamic biped walking, 1999, IEEE, pp. 368-374.*
Yamaguchi et al., Development of a bipedal humanoid robot having antagonistic driven joints and three DOF trunk, 1998, IEEE, pp. 96-101.*
Nicholls, Bipedal dynamic walking in robotics, 1998, Internet, pp. 1-86.*

* cited by examiner

Primary Examiner—Thomas G. Black
Assistant Examiner—McDieunel Marc
(74) Attorney, Agent, or Firm—Frommer Lawrence & Haug LLP; William S. Frommer

(57) ABSTRACT

An input motion acquiring unit acquires a motion trajectory of an object from an image recognizing unit. A dynamic modeling processor models a plurality of robot motion patterns stored in a robot motion pattern storage unit in a dynamic system form, and stores the modeled robot motion patterns into a robot-motion-pattern-model storage unit. A motion converting unit linearly transforms the plurality of robot motion dynamic models stored in the robot-motion-pattern-model storage unit into prediction motion trajectories. A motion comparing unit compares the input motion trajectory acquired by the motion acquiring unit with the prediction motion trajectories transformed by the motion converting unit. A robot motion selecting unit selects a robot motion pattern having the highest similarity from the robot motion pattern storage unit. The present invention is applicable to a robot apparatus.

2 Claims, 12 Drawing Sheets

INFORMATION PROCESSING APPARATUS AND METHOD, PROGRAM STORAGE MEDIUM, AND PROGRAM

BACKGROUND OF THE INVENTION

1. Field of the Invention

The present invention relates to an information processing apparatus and method, a program storage medium, and a program. More specifically, the present invention relates to an information processing apparatus and method capable of generating a robot motion pattern corresponding to an input motion pattern, a program storage medium, and a program.

2. Description of the Related Art

Studies on neural networks as one model of human or animal brain have been made. In neural networks, it can be determined whether or not input data corresponds to a motion pattern that is pre-learned.

In one neural network technology, for example, pairs of associated motion patterns are stored in advance using a neural network in a robot that generates its own motion pattern based on a motion pattern of an object photographed with a camera. A motion pattern having the highest similarity to an input motion pattern is generated from the stored robot motion patterns (see, for example, Yasuaki Yorozu and Yasuo Kuniyoshi, "shikaku-undo yugo ni motoduku udedousa no genshi mohou model (visual-motor-based primitive imitation models of arm motions)," Proceedings of the Annual Conference of the Robotics Society of Japan, 2001).

In the method disclosed in the above-noted publication, however, an input motion pattern and a robot motion pattern must be associated with each other in advance.

Another problem is that the generalized performance for recognizing an input motion pattern depends upon the generalized performance of a learning model to be associated with the input motion pattern, which are stored.

Still another problem is that a generated robot motion pattern corresponding to an input motion pattern does not always meet geometric or physical constraints of robot motion control.

SUMMARY OF THE INVENTION

Accordingly, it is an object of the present invention to easily generate a robot motion pattern corresponding to an input motion pattern without associating the input motion pattern with the robot motion pattern in advance.

In one aspect of the present invention, an information processing apparatus includes a motion pattern acquiring unit that acquires a motion pattern of an object, a modeling unit that models a robot motion pattern executable on a robot control device in a reproducible dynamic form, a storage unit that stores a plurality of robot motion patterns that are modeled by the modeling unit, a comparing unit that compares the modeled robot motion patterns stored in the storage unit with the motion pattern acquired by the motion pattern acquiring unit, and a selecting unit that selects, based on comparison results of the comparing unit, a robot motion pattern to be generated.

The information processing apparatus may further include an error calculating unit that determines a linear transformation from the modeled robot motion patterns stored in the storage unit to the motion pattern acquired by the motion pattern acquiring unit based on errors between the modeled robot motion patterns and the acquired motion pattern. The comparing unit may perform the comparison based on the linear transformation determined by the error calculating unit.

The modeling unit, the storage unit, and the comparing unit may constitute a recurrent neural network (RNN).

In another aspect of the present invention, an information processing method includes a motion pattern acquiring step of acquiring a motion pattern of an object, a modeling step of modeling a robot motion pattern executable on a robot control device in a reproducible dynamic form, a storing step of storing a plurality of robot motion patterns that are modeled in the modeling step, a comparing step of comparing the plurality of modeled robot motion patterns stored in the storing step with the motion pattern acquired in the motion pattern acquiring step, and a selecting step of selecting, based on comparison results in the comparing step, a robot motion pattern to be generated.

In still another aspect of the present invention, a program storage medium stores a program that causes a computer to execute a motion pattern acquiring step of acquiring a motion pattern of an object, a modeling step of modeling a robot motion pattern executable on a robot control device in a reproducible dynamic form, a storing step of storing a plurality of robot motion patterns that are modeled in the modeling step, a comparing step of comparing the plurality of modeled robot motion patterns stored in the storing step with the motion pattern acquired in the motion pattern acquiring step, and a selecting step of selecting, based on comparison results in the comparing step, a robot motion pattern to be generated.

In still another aspect of the present invention, a program causes a computer to execute a motion pattern acquiring step of acquiring a motion pattern of an object, a modeling step of modeling a robot motion pattern executable on a robot control device in a reproducible dynamic form, a storing step of storing a plurality of robot motion patterns that are modeled in the modeling step, a comparing step of comparing the plurality of modeled robot motion patterns stored in the storing step with the motion pattern acquired in the motion pattern acquiring step, and a selecting step of selecting, based on comparison results in the comparing step, a robot motion pattern to be generated.

In the present invention, a motion pattern of an object is acquired, and a plurality of robot motion patterns executable on a robot control device are modeled and stored. The plurality of stored robot motion patterns are compared with the acquired motion pattern of the object, and a robot motion pattern to be generated is selected based on a comparison result.

According to the present invention, a robot motion pattern corresponding to an input motion pattern can be generated. An input motion pattern is compared with pre-stored robot motion patterns, thus eliminating the necessity to associate an input motion pattern with a robot motion pattern in order to select a motion pattern to be generated.

DESCRIPTION OF THE PREFERRED EMBODIMENTS

An embodiment of the present invention will now be described with reference to the drawings.

Figure 1:
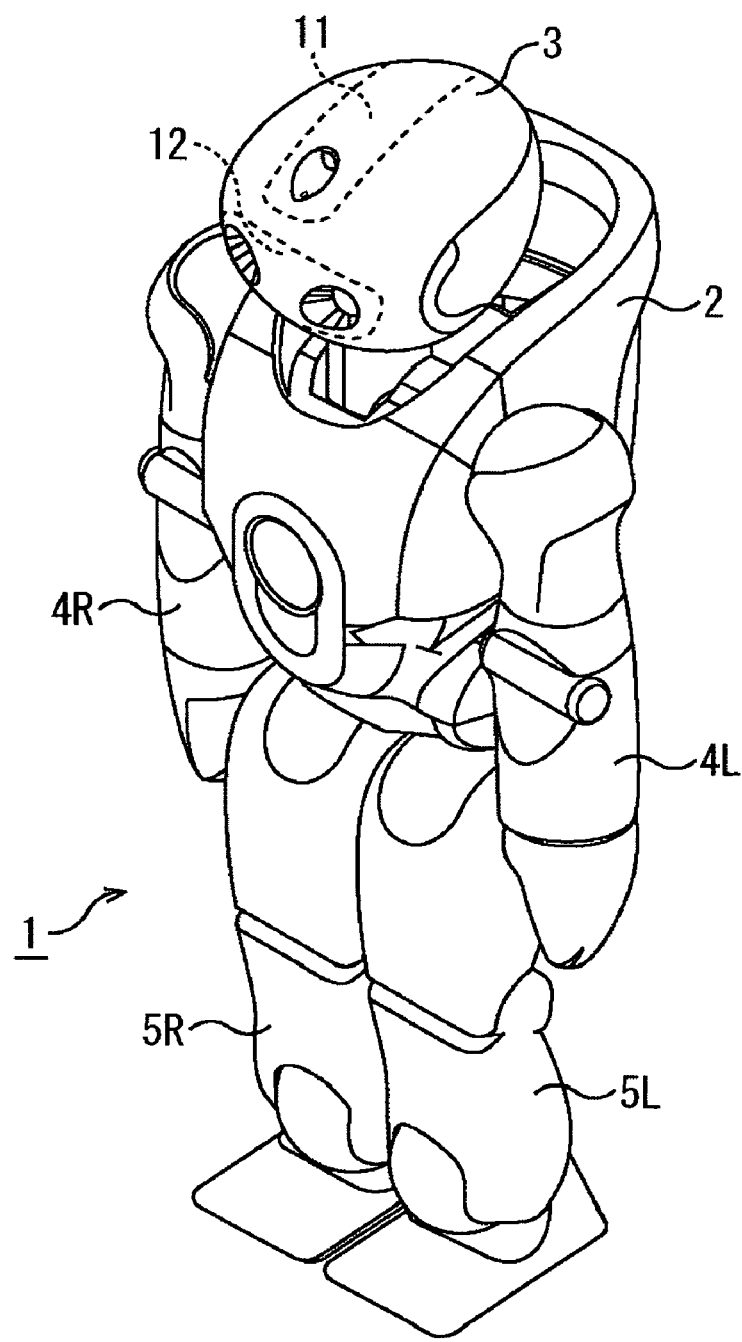
FIG. 1 is an external perspective view of a robot according to the present invention.

FIG. 1 is an external perspective view of a biped walking robot 1 according to an embodiment of the present invention. The robot 1 is a utility robot for supporting human activities in living environments and other living scenes, and is capable of acting according to emotions of anger, grief, happiness, joy, etc., and performing basic motions of the human.

The robot 1 is composed of a body unit 2, a head unit 3 disposed above the body unit 2, arm units 4R and 4L having a similar structure, and leg units 5R and 5L having a similar structure. The arm units 4R and 4L are disposed in position on the right and left upper portions of the body unit 2, respectively, and the leg units 5R and 5L are disposed in position on the right and left lower portion of the body unit 2, respectively. The head unit 3 includes a touch sensor 11 and a display unit 12.

Figure 2:
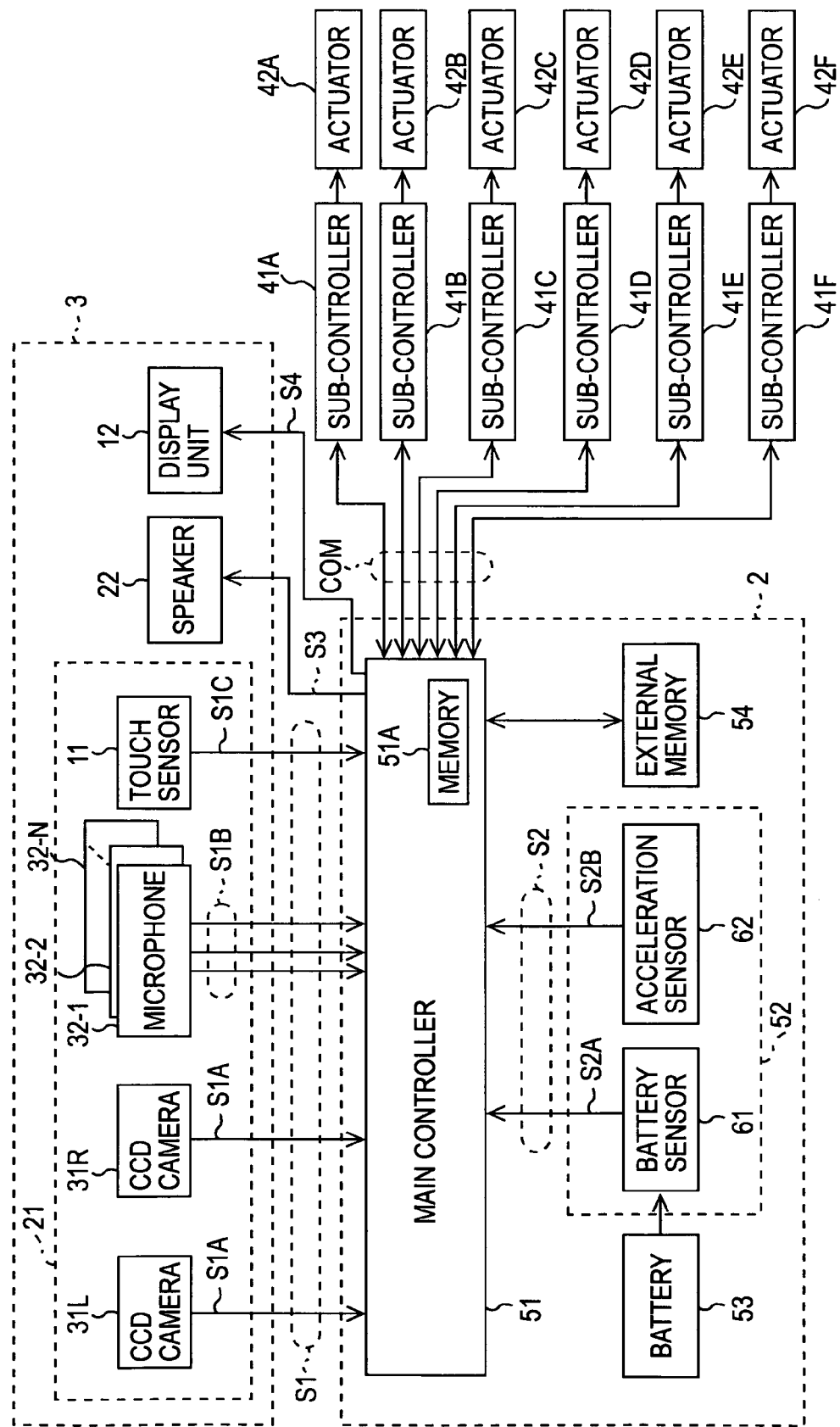
FIG. 2 is a block diagram showing the electrical structure of the robot.

FIG. 2 is a block diagram showing the electrical structure of the robot 1.

The head unit 3 includes an external sensor 21 having a charge coupled device (CCD) cameras 31L and 31R serving as the "eye" of the robot 1, microphones 32-1 to 32-N serving as the "ear" of the robot 1, and a touch sensor 11. The head unit 3 further includes a speaker 22 serving as the "mouth" of the robot 1, and a display unit 12 for displaying the state of the robot 1 and a response from the user. The body unit 2 includes a main controller 51 for controlling the overall operation of the robot 1, an internal sensor 52 having a battery sensor 61 and an acceleration sensor 62, a battery 53, and an external memory 54. The body unit 2 further includes peripheral circuits (not shown), such as a power supply circuit and a communication circuit.

The body unit 2 is connected with sub-controllers 41A to 41F disposed in the body unit 2, the head unit 3, the arm units 4L and 4R, and the leg units 5L and 5R, and supplies a necessary power supply voltage to the sub-controllers 41A to 41F or communicates with the sub-controllers 41A to 41F.

The sub-controllers 41A to 41F are connected with actuators 42A to 42F disposed in the body unit 2, the head unit 3, the arm units 4L and 4R, and the leg units 5L and 5R. The sub-controllers 41A to 41F control the actuators 42A to 42F to be driven in a specified mode according to various control commands supplied from the main controller 51.

The CCD cameras 31L and 31R of the external sensor 21 capture a scene around the robot 1, and send a resulting image signal S1A to the main controller 51. The microphones 32-1 to 32-N (hereinafter generally referred to as a microphone 32 if N microphones 32-1 to 32-N need not be individually identified) collect various instructions (or speech commands) given by the user as audio input, such as "Walk!", "Stop!" and "Raise the right hand!", and send a resulting audio signal S1B to the main controller 51.

As shown in FIG. 1, the touch sensor 11 is disposed, for example, on the top of the head unit 3. The touch sensor 11 detects a pressure caused by physical stimulation from the user, such as "praise" or "hitting", and sends a pressure detection signal S1C indicating the detected pressure to the main controller 51.

The battery sensor 61 of the internal sensor 52 detects the amount of residual energy of the battery 53 with predetermined intervals, and sends a battery residue detection signal S2A indicating the detected battery residue to the main controller 51. The acceleration sensor 62 detects the acceleration of the moving robot 1 in three axes (that is, the x axis, the y axis, and the z axis) with predetermined intervals, and sends an acceleration detection signal S2B indicating the detected acceleration to the main controller 51.

The external memory 54 stores programs, data, control parameters, etc. The stored programs or data is supplied to an internal memory 51A of the main controller 51, if necessary. The external memory 54 also receives data, etc., from the memory 51A and stores it. The external memory 54 is removable from the robot 1.

The memory 51A of the main controller 51 stores programs and data. The main controller 51 executes the programs stored in the memory 51A to perform various types of processing. The main controller 51 determines the peripheral or internal conditions of the robot 1, an instruction from the user, the presence of stimulation from the user, etc., based on the image signal S1A supplied from the CCD cameras 31L and 31R, the audio signal S1B from the microphone 32, the pressure detection signal S1C from the touch sensor 11 of the external sensor 21, the battery residue detection signal S2A from the battery sensor 61, and the acceleration detection signal S2B from the acceleration sensor 62 of the internal sensor 52.

The main controller 51 determines the motion of the robot 1 based on the peripheral and internal conditions of the robot 1, an instruction from the user, the presence of stimulation from the user, the control programs stored in advance in the internal memory 51A, the various control parameters stored in the currently loaded external memory 54, or the like. Based on the determination, the main controller 51 generates a control command, and sends the command to the corresponding sub-controllers 41A to 41F. The sub-controllers 41A to 41F control the actuators 42A to 42F based on the control command supplied from the main controller 51. Thus, for example, the robot 1 oscillates the head unit 3 up, down, right, and left, raises the arm unit 4R or 4L, or drives the leg units 5R and 5L to walk.

The main controller 51 further supplies a predetermined audio signal S3 to the speaker 22, if necessary, to output audio corresponding to the audio signal S3 to the outside. For example, when a user voice is detected, the main controller 51 displays a response to the user, e.g., "Who?", on the display unit 12 based on a display signal S4. The main controller 51 outputs a driving signal to light-emitting diodes (LEDs) (not shown) disposed as the "eye" at a predetermined position of the head unit 3 of the robot 1, and turns on and off the LEDs so as to function as the display unit 12.

Accordingly, the robot 1 autonomously acts in accordance with the peripheral and internal conditions (state) of the robot 1, an instruction from the user, the presence of stimulation from the user, etc.

Figure 3:
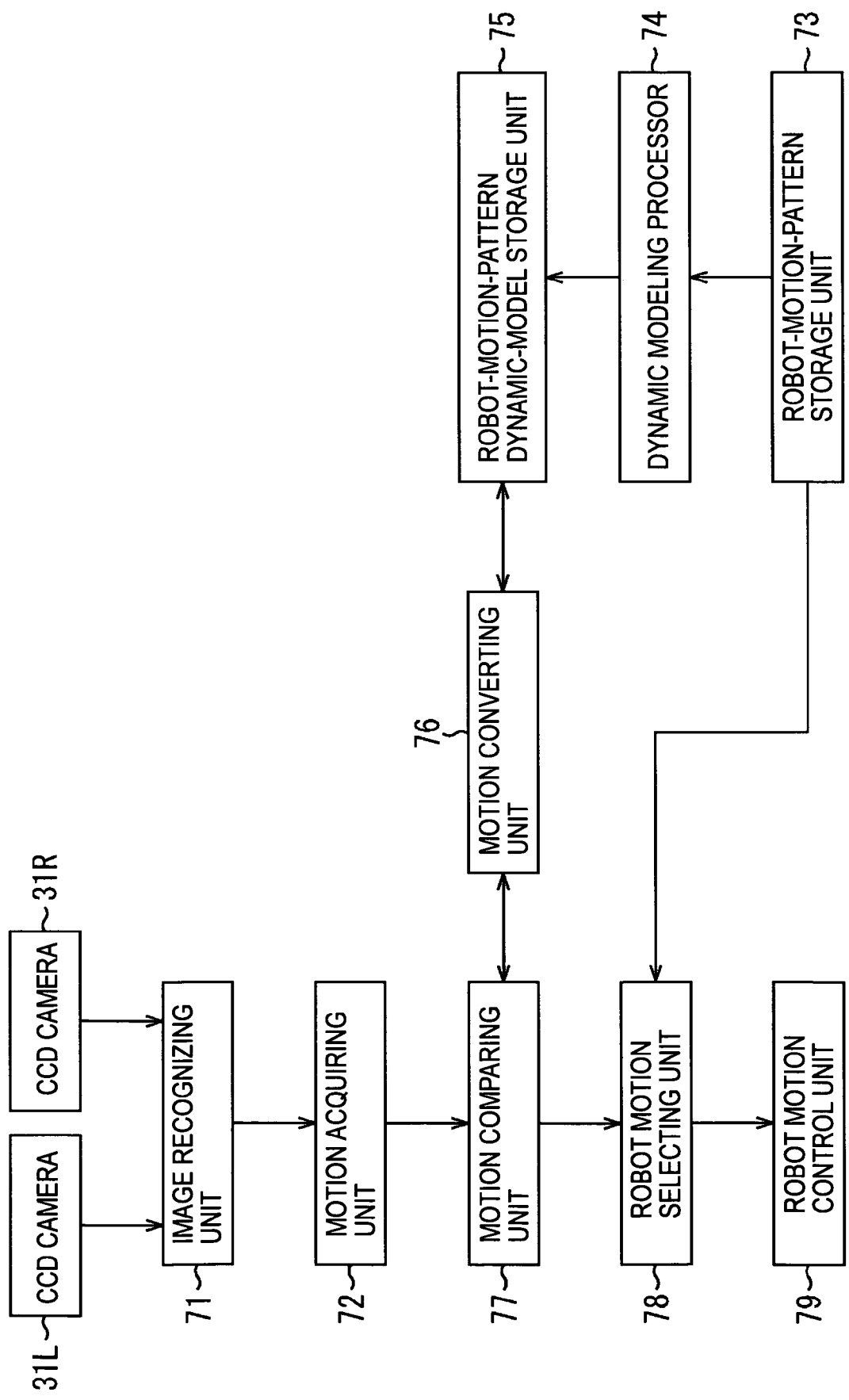
FIG. 3 is a functional diagram of a main controller shown in FIG. 2.

FIG. 3 is a diagram showing the functional structure of the main controller 51 shown in FIG. 2. In FIG. 3, the motion of the robot 1 is determined by image recognition, whereas the motion of the robot 1 may be determined by audio recognition. The functional structure shown in FIG. 3 is realized when the control program stored in the memory 51A is executed by the main controller 51.

An image recognizing unit 71 performs an image recognition process using an image signal supplied from the CCD cameras 31L and 31R, and supplies a motion trajectory of an object, which is an image recognition result, to a motion acquiring unit 72. In many cases, that the user speaks to the robot 1 from the front thereof. Thus, the CCD cameras 31L and 31R are disposed in the head unit 3 so that objects in front of the robot 1 can be photographed, as shown in FIG. 1.

The motion acquiring unit 72 acquires the motion trajectory of the object supplied from the image recognizing unit 71, and supplies it to a motion comparing unit 77. A robot-motion-pattern storage unit 73 stores a plurality of robot motion patterns that can be performed by the robot 1. A dynamic modeling processor 74 sequentially reads the plurality of robot motion patterns stored in the robot-motion-pattern storage unit 73, and represents the read motion patterns in form of reproducible dynamic models.

A robot-motion-pattern dynamic-model storage unit 75 stores the plurality of robot motion patterns represented as reproducible dynamic models by the dynamic modeling processor 74. A motion converting unit 76 reads the dynamic models of the robot motion patterns from the robot-motion-pattern dynamic-model storage unit 75, and linearly transforms them into prediction motion trajectories.

The motion comparing unit 77 compares the input motion trajectory of the object supplied from the motion acquiring unit 72 with each of the prediction motion trajectories supplied from the motion converting unit 76, and determines the similarity between the trajectories based on a prediction error determined by the distance between the trajectories. The motion converting unit 76 determines a linear transformation such that the prediction error can be minimized, and the robot-motion-pattern dynamic-model storage unit 75 adjusts the phase of the motion trajectory generated from a dynamic model so that the difference in distance between the trajectories can be minimized. The motion comparing unit 77 compares the input motion trajectory with the plurality of prediction motion trajectories, and then supplies comparison results to a robot motion selecting unit 78.

The robot motion selecting unit 78 selects a robot motion pattern corresponding to the highest-similarity robot motion pattern dynamic model from the robot-motion-pattern storage unit 73 based on the comparison results supplied from the motion comparing unit 77, and supplies the selected motion pattern to a robot motion control unit 79.

The robot motion control unit 79 controls the actuators 42A to 42F of the robot 1 to be driven in a specified mode based on the robot motion pattern selected by the robot motion selecting unit 78.

The dynamic modeling processor 74, the robot-motion-pattern dynamic-model storage unit 75, the motion converting unit 76, and the motion comparing unit 77 constitute a motion pattern learning function, and this function may be implemented by a recurrent neural network (RNN).

Figure 4:
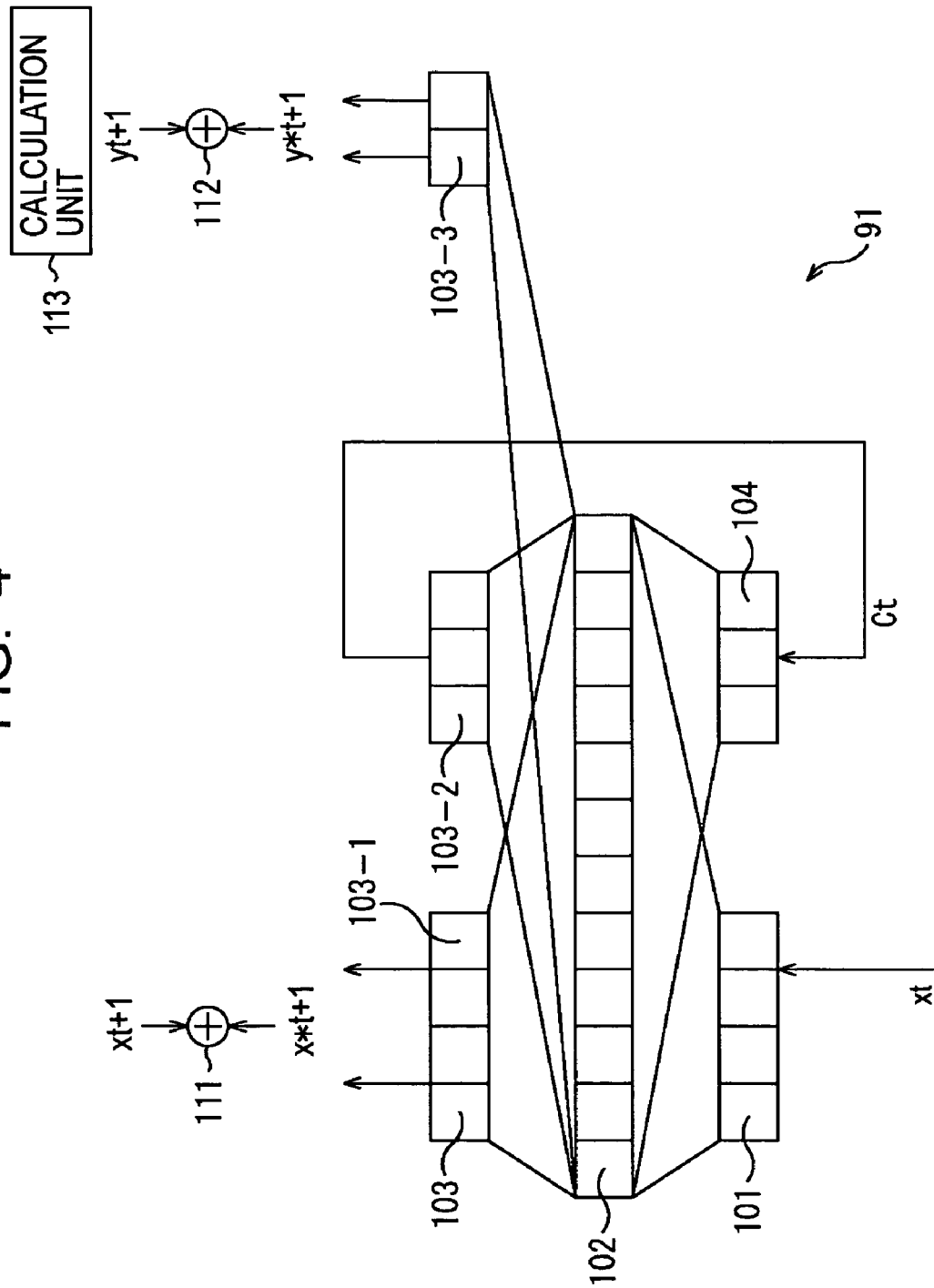
FIG. 4 is an illustration showing the structure of an RNN.

FIG. 4 illustrates the structure of an RNN 91. The RNN 91 is constituted by an input layer 101, an intermediate layer (hidden layer) 102, an output layer 103, and a context layer 104. Each of the input layer 101, the intermediate layer 102, the output layer 103, and the context layer 104 is composed of an arbitrary number of neurons.

The neurons of the input layer 101 receive data xt indicating a time-series pattern from the robot-motion-pattern dynamic-model storage unit 75. For example, when a robot motion pattern is represented by an articulation angle trajectory, an articulation angle trajectory xt at time t is input to the neurons of the input layer 101.

The neurons of the intermediate layer 102 sum the input data with weights, and sequentially output the resulting data to the subsequent stage. Specifically, the input data xt and Ct are subjected to calculation with a predetermined weighting coefficient (that is, non-linear function calculation), and are then output to the output layer 103. In this embodiment, for example, a predetermined weighted sum of input data xt and Ct is subjected to non-linear output function calculation, such as a sigmoid function, and is then output to the output layer 103.

Neurons 103-1 of the output layer 103 output data $x^*t+1$ corresponding to the input data. Neurons 103-3 of the output layer 103 output data $y^*t+1$ corresponding to the input data.

The data output from neurons 103-2 of the output layer 103 is fed back to the context layer 104 as context data Ct indicating the internal state of the RNN 91. The term "Context" is a general recurrent neural network term, and is described in, for example, Elman, J. L., "Finding structure in time", Cognitive Science, 14, 179–211 (1990).

The RNN 91 includes error calculation units 111 and 112 for back-propagation learning. A calculation unit 113 sets a weighting coefficient of the RNN 91.

Figure 5:
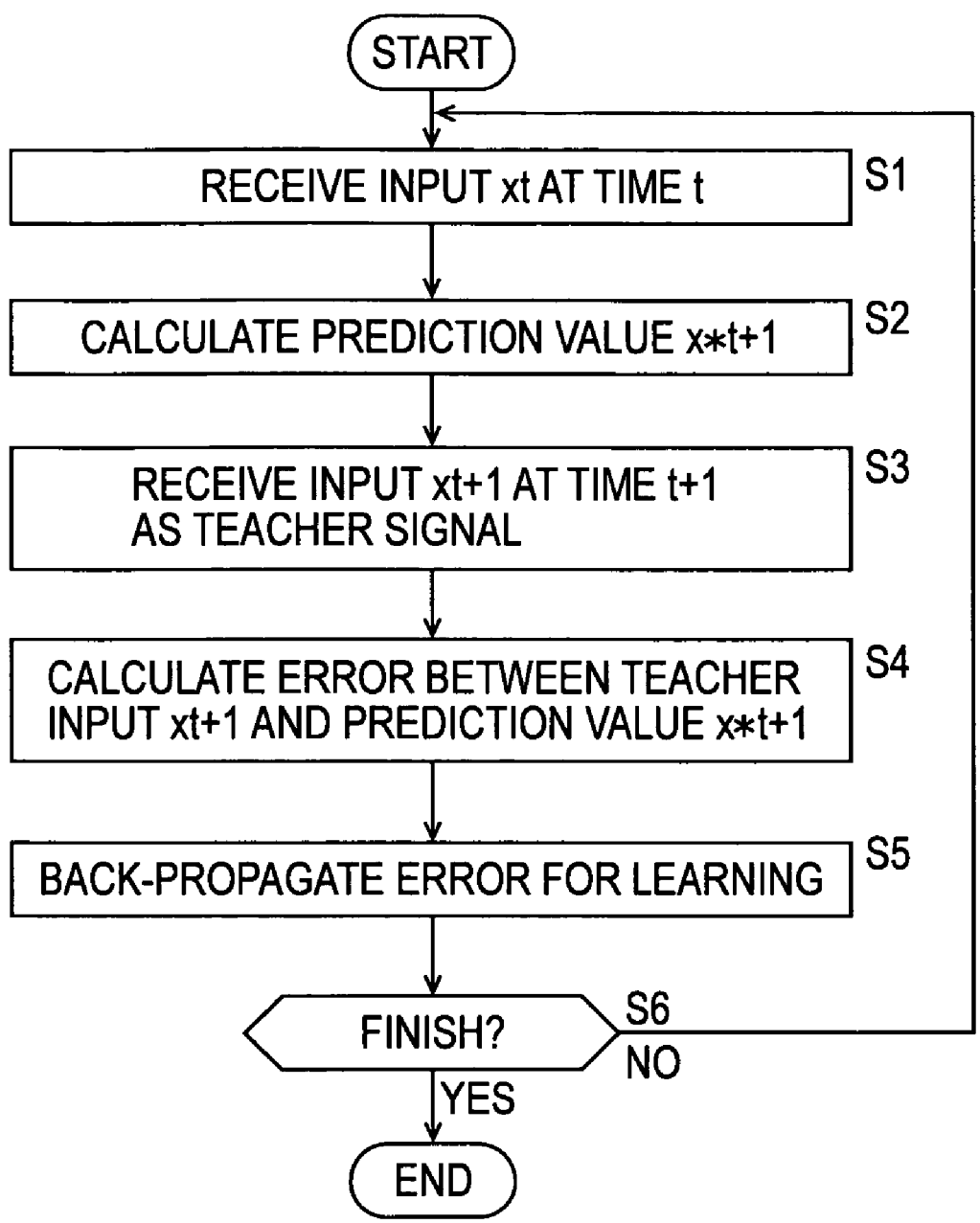
FIG. 5 is a flowchart showing a process for learning a robot motion pattern.

FIG. 5 is a flowchart showing a robot motion pattern learning process executed by the RNN 91. This process is performed on each robot motion pattern to be learned. In other words, a number of virtual RNNs equal to the number of robot motion patterns to be learned are provided, and the learning process shown in FIG. 5 is performed by each virtual RNN.

After performing the process shown in FIG. 5 to learn a motion pattern for each virtual RNN, the coefficient of the actual RNN 91 is set. In the following description, the virtual RNNs are also referred to as the RNN 91.

In step S1, an input robot motion pattern (e.g., an articulation angle trajectory) xt at predetermined time t is input to the input layer 101 of the RNN 91. In step S2, the input data xt is subjected to calculation with a weighting coefficient in the intermediate layer 102 of the RNN 91, and a prediction value $x^*t+1$ of the input robot motion pattern at time t+1 is output from the neurons 103-1 of the output layer 103.

In step S3, the error calculation unit 111 receives an input robot motion pattern xt+1 at time t+1 as a teacher signal. In step S4, the error calculation unit 111 determines the error between the teacher input xt+1 received in step S3 and the prediction value $x^*t+1$ determined in step S2.

In step S5, the error determined in step S4 is input from the neurons 103-1 of the output layer 103 of the RNN 91, and is propagated (back-propagated) to the intermediate layer 102 and the input layer 101 in the stated order for learning. Then, the calculation result (i.e., a weighting coefficient) is obtained.

In step S6, the RNN 91 determines whether or not the learning process for this robot motion pattern is finished. If it is not finished, that is, the defined learning step has not been reached or the learning error is greater than a predetermined value, the process returns to step S1 to repeat the subsequent processing. If it is determined in step S6 that the learning process for this robot motion pattern is finished, the process shown in FIG. 5 ends.

Figure 6:
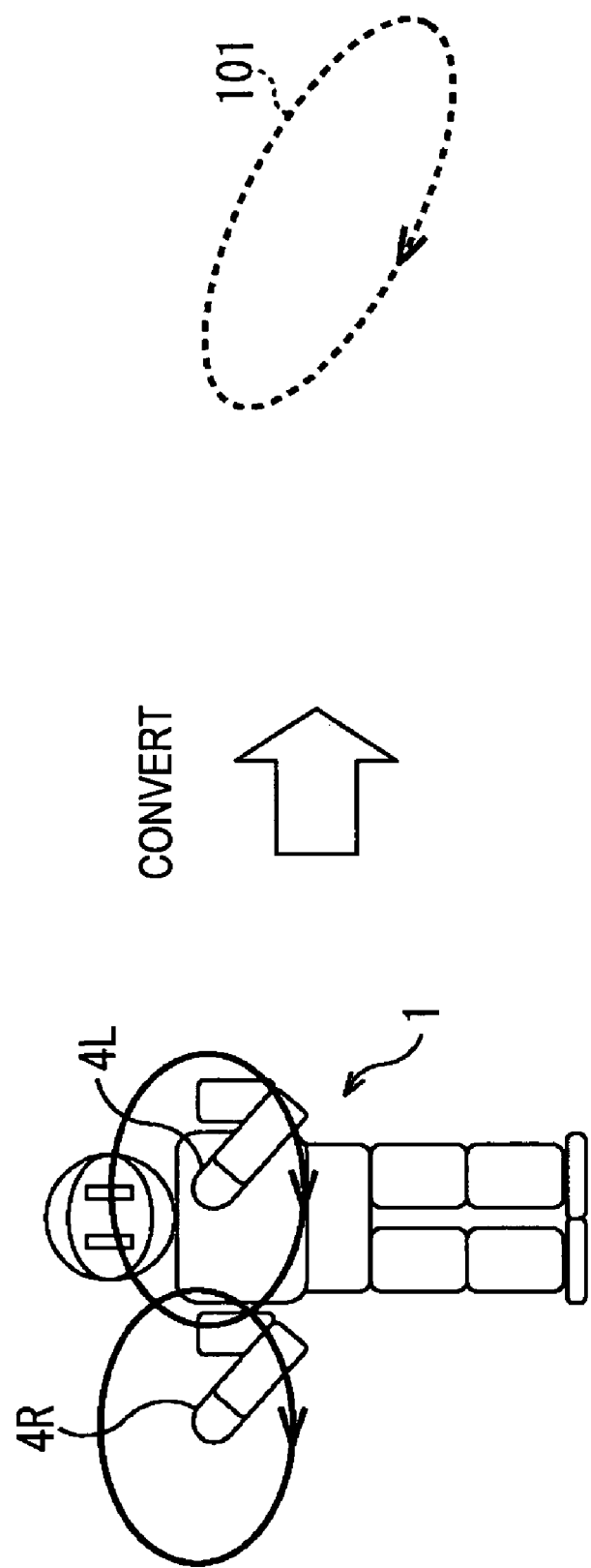
FIG. 6 is an illustration of a pre-learned robot motion pattern.
Figure 7:
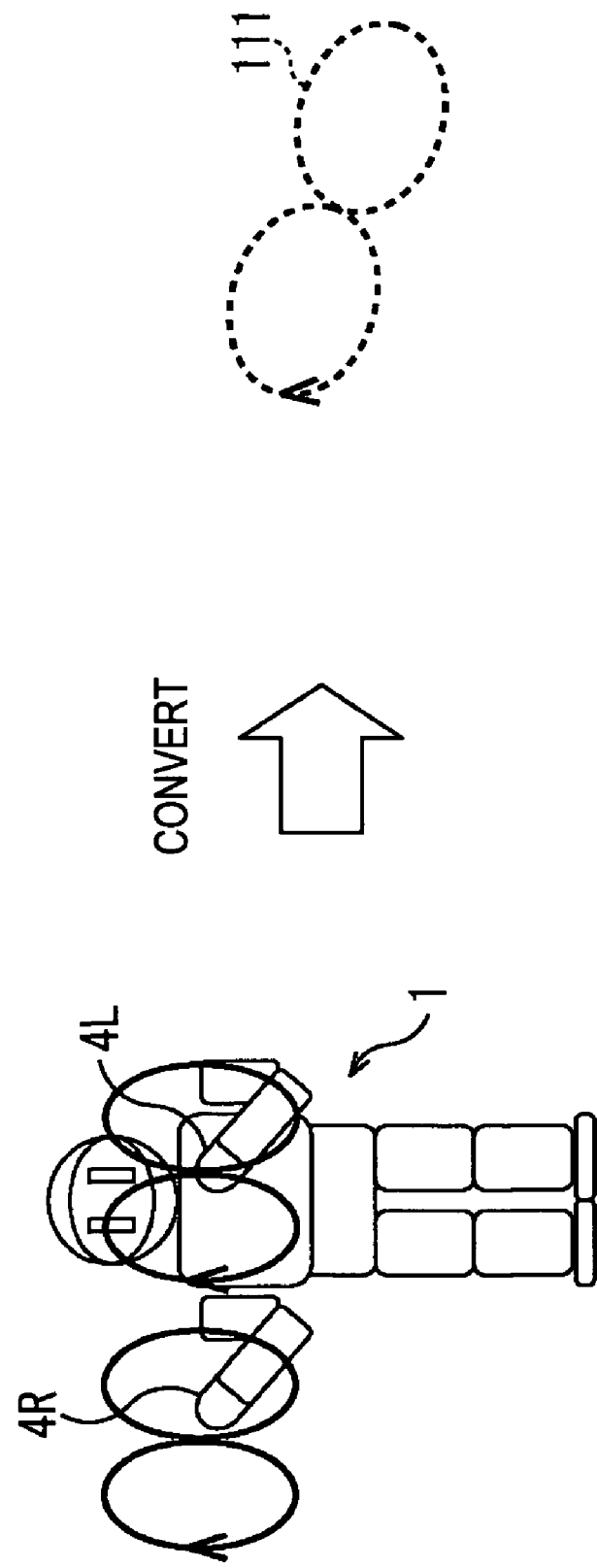
FIG. 7 is an illustration of another pre-learned robot motion pattern.
Figure 8:
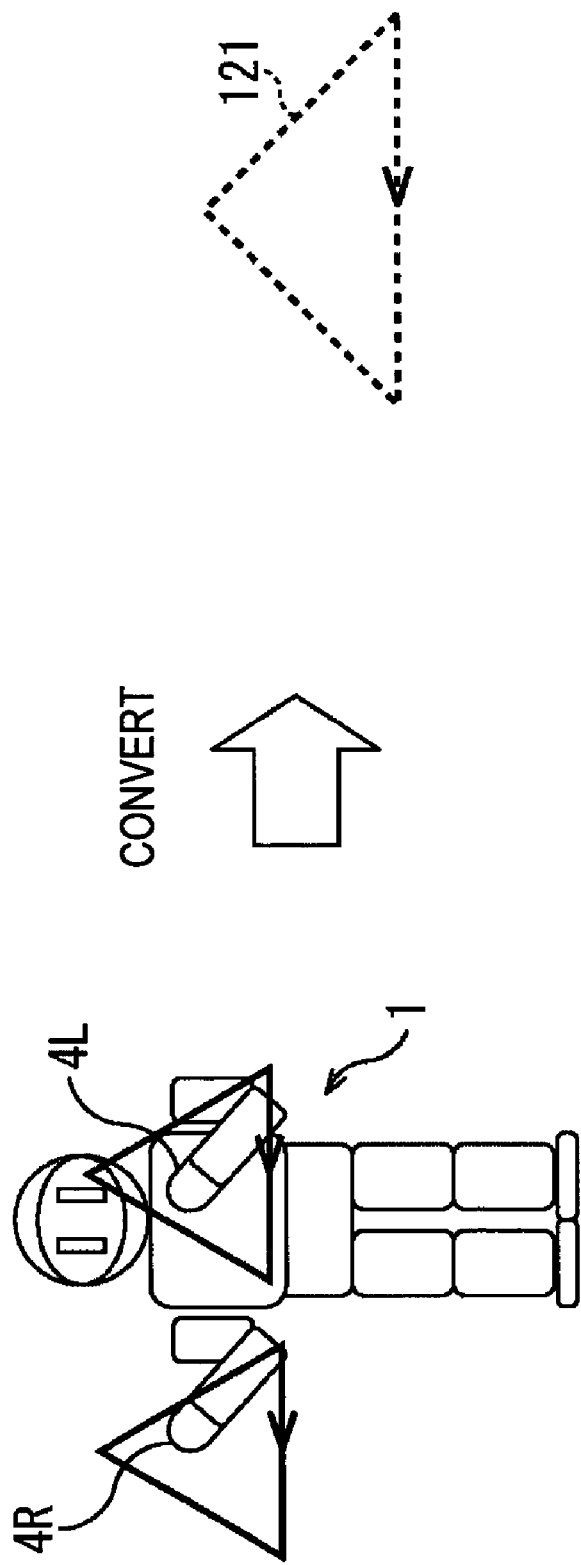
FIG. 8 is an illustration of another pre-learned robot motion pattern.

FIGS. 6 to 8 show robot motion patterns that are learned by the learning process described above.

FIG. 6 shows a pre-learned robot motion pattern 101 of a circular motion of the arm units 4L and 4R of the robot 1.

FIG. 7 shows a pre-learned robot motion pattern 111 of a figure-of-eight motion of the arm units 4L and 4R of the robot 1.

FIG. 8 shows a pre-learned robot motion pattern 121 of a triangular motion of the arm units 4L and 4R of the robot 1.

In this way, a plurality of robot motion patterns are pre-learned, and a number of RNNs 91 equal to the number of robot motion patterns are provided. For example, in a case where three robot motion patterns are pre-learned, three RNNs 91 are provided. One input motion pattern is recognized by all RNNs.

Figure 9:
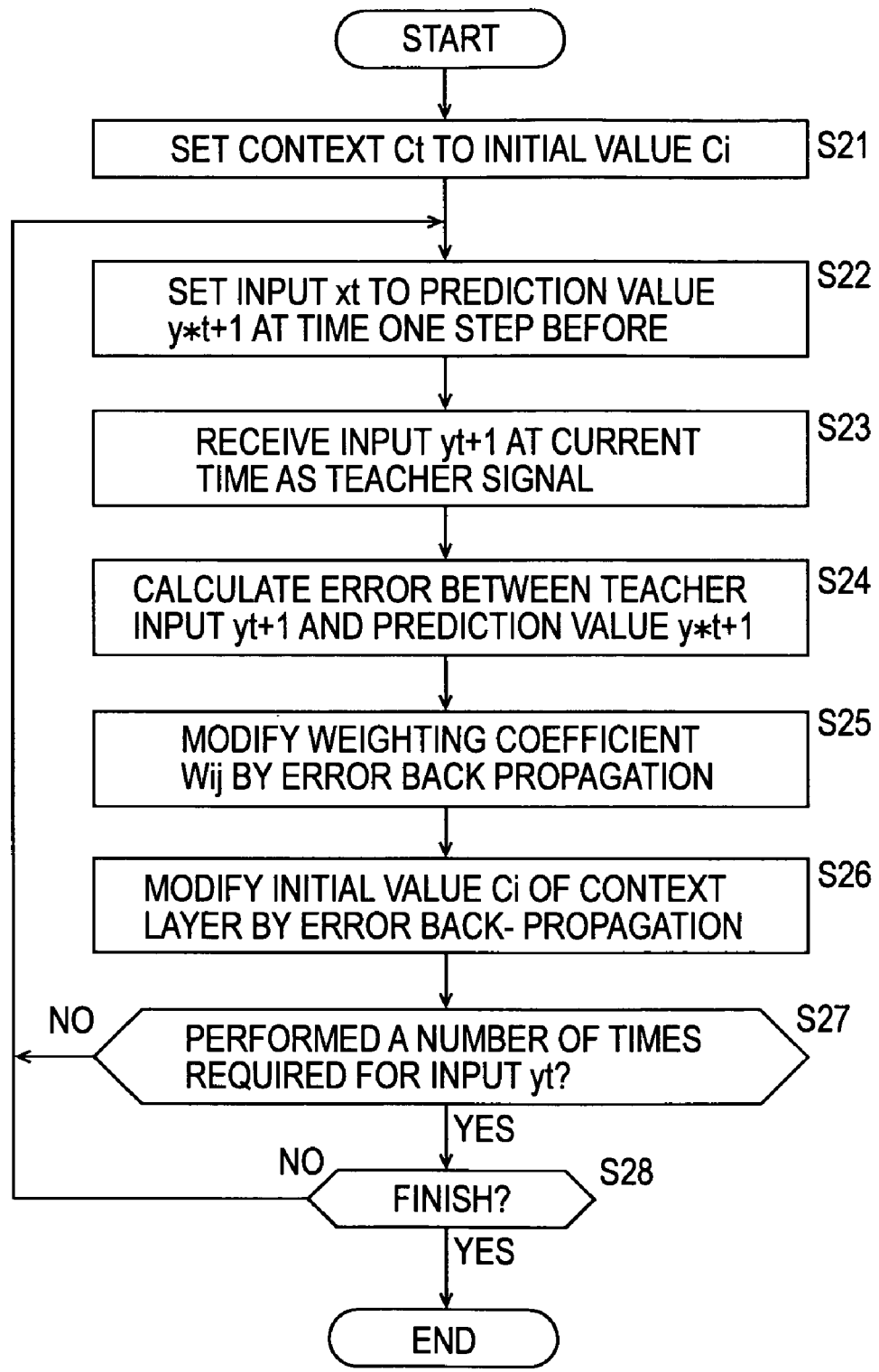
FIG. 9 is a flowchart showing a process for recognizing an input motion pattern.

FIG. 9 is a flowchart showing a process for recognizing an input motion pattern. This process is performed by each RNN 91 on one input motion pattern to be recognized.

In step S21, the RNN 91 sets the context data Ct to an initial value Ci in the context layer 104. In step S22, the RNN 91 sets the input data xt to a prediction value y*t+1 at time one step before in the intermediate layer 102. In the intermediate layer 102, a linear transformation Oi is calculated by Eq. 1 below to determine a prediction value y*t+1 of the input motion trajectory from the robot motion pattern dynamic model. The prediction value y*t+1 is output from the neurons 103-3 of the output layer 103.

$$Oi = \Sigma Wij \cdot Hj \qquad \text{Eq. 1}$$

where i is a value for identifying the input layer 101, the intermediate layer 102, the output layer 103, and the context layer 104. If i is the value of the output layer 103 and j is the value of the intermediate layer 102, Wij indicates the weighting coefficient from the intermediate layer 102 to the output layer 103. In Eq. 1, Hj indicates a weighting coefficient sum of the outputs of the input layer 101 and the context layer 104. Thus, the linear transformation Oi represents a linearly transformed value (vector) (i.e., a weighting coefficient sum) of the intermediate layer 102.

In step S23, the error calculation unit 112 receives an input motion pattern yt+1 at current time t+1 as a teacher signal. In step S24, the error calculation unit 112 calculates the error between the teacher input yt+1 received in step S23 and the prediction value y*t+1 determined in step S22.

In step S25, the error determined in step S24 is input from the neurons 103-3 of the output layer 103 of the RNN 91, and is propagated (back-propagated) to the intermediate layer 102 and the input layer 101 in the stated order to modify the weighting coefficient Wij. Thus, a linear transformation Oi is determined such that the prediction error of the input motion trajectory can be minimized.

In step S26, RNN 91 propagates (back-propagates) the error determined in step S24 to the neurons 103-2 of the output layer 103, the intermediate layer 102, and the input layer 101 in the stated order to modify the initial value Ci of the context layer 104. Thus, the phase of the robot motion trajectory generated from the dynamic model is adjusted so that the prediction error of the input motion trajectory can be minimized.

In step S27, the RNN 91 determines whether or not the process has been performed a number of times equal to the number of time steps of the input motion pattern yt. If it is determined that the process has not been performed a number of times equal to the number of time steps, the process returns to step S22 to repeat the subsequent processing. If it is determined in step S27 that the process has been performed a number of times equal to the number of time steps of the input motion pattern yt, the process proceeds to step S28.

In step S28, the RNN 91 determines whether or not the recognition process of the input motion pattern is finished. If it is not finished, that is, the predefined number of times to be repeated has not been reached, the process returns to step S22 to repeat the subsequent processing. If it is determined in step S28 that the recognition process of the input motion pattern is finished, the recognition process shown in FIG. 9 ends.

Figure 10:
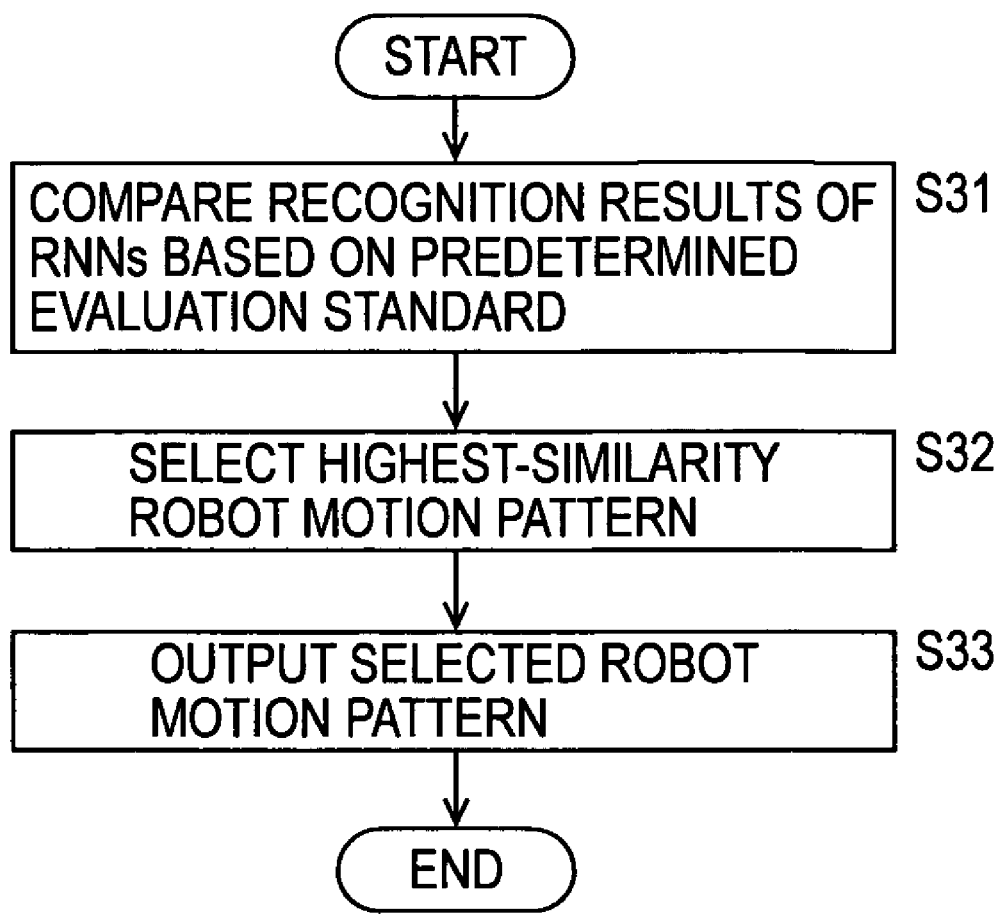
FIG. 10 is a flowchart showing a process for selecting a robot motion pattern.

Therefore, an input motion pattern is recognized by each RNN. The pattern recognition on one input motion pattern, and a plurality of recognized results (recognized errors) determined by the RNNs are then compared to select the highest-similarity robot motion pattern. FIG. 10 is a flowchart showing this selecting process.

In step S31, the robot motion selecting unit 78 compares the recognition results of the RNNs determined by the recognition process shown in FIG. 9 based on a predetermined evaluation standard.

The predetermined evaluation standard is, for example, a learning error after a predetermined number of learning steps, or the number of learning steps for reaching a predetermined learning error. In general, learning performed by an RNN is to minimize the error between a teacher pattern and an output pattern by repeating the calculation. Thus, when the learning performances of a plurality of RNNs are compared, if it is determined whether or not the learning process is finished based on the number of learning steps (i.e., the number of times the calculation is repeated), the level of the learning error (that is, a final error after the calculation is repeated) becomes the learning performance evaluation standard. If it is determined whether or not the learning process is finished based on whether or not a predetermined level of learning error has been reached, the number of learning steps becomes the learning performance evaluation standard.

In step S32, the robot motion selecting unit 78 selects a robot motion pattern corresponding to the highest-similarity robot motion dynamic model based on the comparison in step S31 from the robot-motion-pattern dynamic-model storage unit 75. In step S33, the robot motion selecting unit 78 outputs the robot motion pattern selected in step S32 to the robot motion control unit 79. The robot motion control unit 79 controls the actuators 42A to 42F of the robot 1 so as to be driven in a specified mode based on the robot motion pattern output from the robot motion selecting unit 78.

Therefore, a robot motion pattern of the robot 1 that expresses an image of an input motion pattern (motion of the user) is generated.

Figure 11:
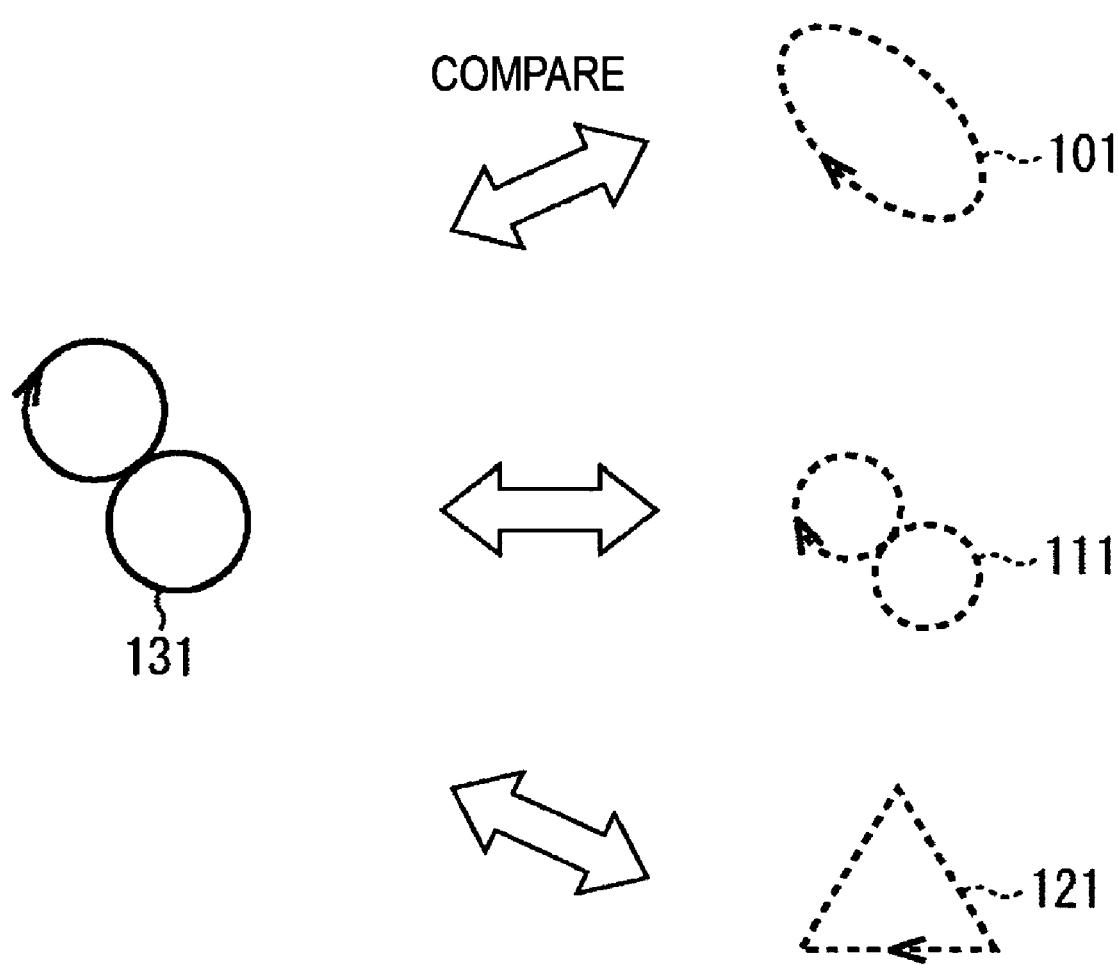
FIG. 11 is a diagram schematically showing comparison between an input motion pattern and robot motion patterns.

FIG. 11 schematically shows a process for comparing an input motion pattern with robot motion patterns. In FIG. 11, the robot motion patterns 101, 111, and 121 shown in FIGS. 6 to 8 are pre-learned, and are stored in the robot-motion-pattern dynamic-model storage unit 75.

For example, when the user moves an arm in a figure-of-eight fashion in front of the robot 1, the CCD cameras 31L and 31R captures this motion, and an input motion pattern 131 is input to the RNN 91. The RNN 91 compares the input motion pattern 131 with the robot motion patterns 101, 111, and 121 stored in the robot-motion-pattern dynamic-model storage unit 75, and determines similarities (i.e., recognized errors) between the input motion pattern 131 and the robot motion patterns 101, 111, and 121. Then, the robot motion selecting unit 78 selects the robot motion pattern 111 as the robot motion pattern having the highest similarity to the input motion pattern 131. The robot motion control unit 79 controls the actuators 42A to 42F of the robot 1 based on the robot motion pattern 111 selected by the robot motion selecting unit 78. Thus, the figure-of-eight robot motion pattern is generated as the motion of the robot 1.

Therefore, a motion pattern of the robot 1 that represents an image of an input motion pattern can be generated without associating the input motion pattern with a robot motion pattern in advance.

The above-described series of processes may be implemented by hardware or software. When the series of processes is implemented by hardware, a personal computer 200 shown in FIG. 12 is used, by way of example.

Figure 12:
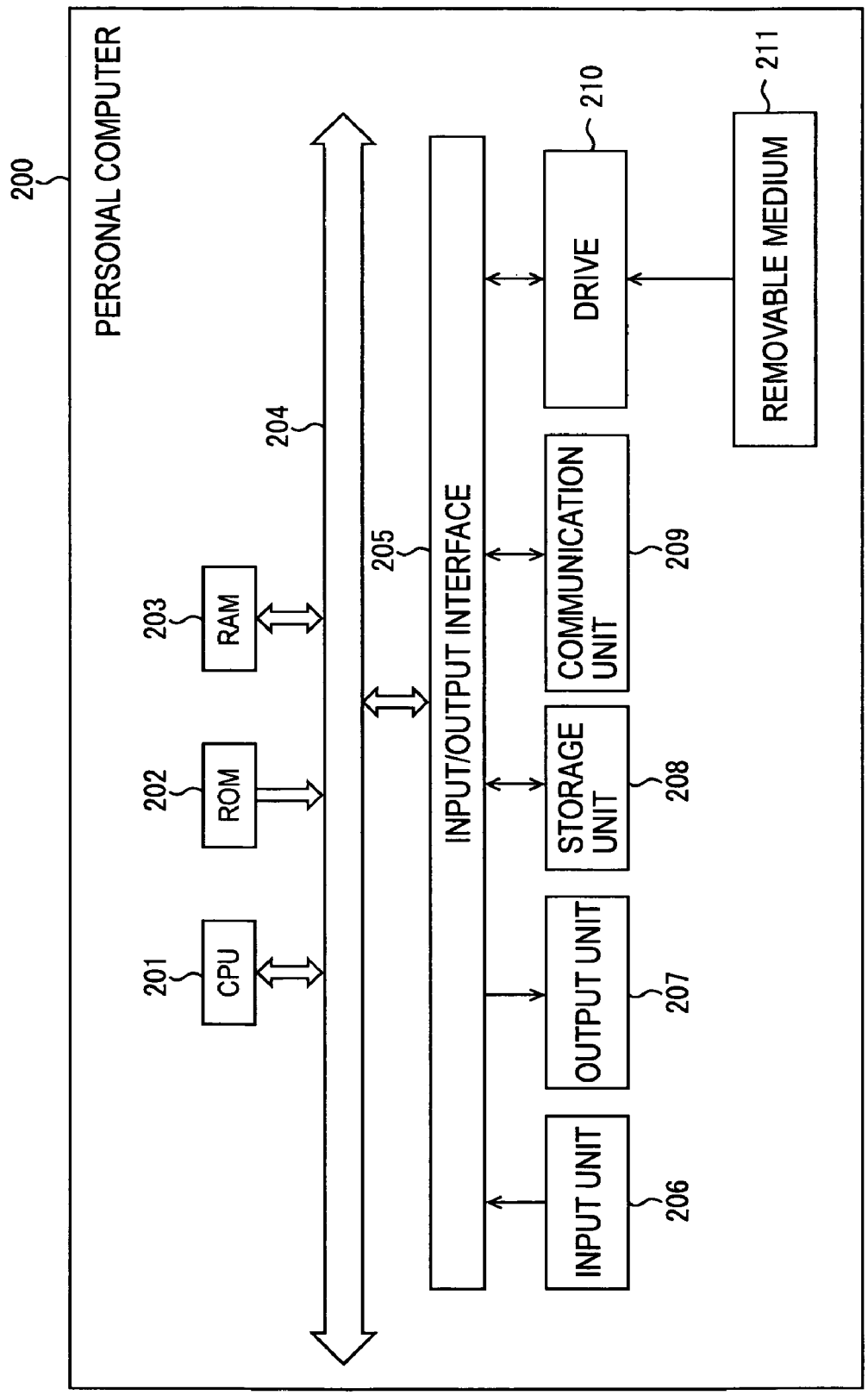
FIG. 12 is a block diagram of a personal computer according to the present invention.

In FIG. 12, a central processing unit (CPU) 201 performs processing according to a program stored in a read-only memory (ROM) 202, or a program loaded from a storage unit 208 to a random access memory (RAM) 203. The RAM 203 also stores data, etc., necessary for the CPU 201 to perform various types of processing.

The CPU 201, the ROM 202, and the RAM 203 are connected with one another via a bus 204. An input/output interface 205 is also connected to the bus 204.

The input/output interface 205 is connected with an input unit 206 constituted by a keyboard, a mouse, and so on, an output unit 207 constituted by a display, such as a cathode-ray tube (CRT) or a liquid crystal display (LCD), a speaker, and so on, the storage unit 208 constituted by a hard disk and so on, and a communication unit 209 constituted by a modem, a terminal adapter, and so on. The communication unit 209 performs communication via a network.

The input/output interface 205 is further connected with a drive 210, if necessary, into which a removable medium 211 such as a magnetic disk, an optical disk, a magneto-optical disk, or a semiconductor memory is inserted. A computer program read from such a removable medium 211 is installed into the storage unit 208, if necessary.

When the series of processes is implemented by software, a program constituting the software is installed to the personal computer 200 from a network or a recording medium.

As shown in FIG. 12, this recording medium may be a removable medium 211 separate from the apparatus for distributing the program to users, in which the program is recorded, such as magnetic disk (including a floppy disk), an optical disk (including a CD-ROM (Compact Disk-Read Only Memory) and a DVD (Digital Versatile Disk)), a magneto-optical disk (including an MD (Mini-Disk) (registered trademark)), or a semiconductor memory, or may be a device incorporated in the apparatus, such as the ROM 202 in which the program is recorded or a hard disk contained in the storage unit 208.

As used herein, the step describing the program recorded in a recording medium includes not only processes executed in a time series manner according to the order given but also processes executed in parallel or separately.

The illustrated embodiments are merely examples of the present invention, and the present invention is not limited to these embodiments. A variety of modifications may be made without departing from the scope of the invention.

What is claimed is:

1. An information processing apparatus comprising:
modeling means for modeling a robot motion pattern executable on a robot control device in a reproducible dynamic form;
storing means for storing a plurality of robot motion patterns that are modeled by the modeling means;
motion pattern acquiring means for acquiring a motion pattern of an object, wherein the object is intended to be performed by the robot control device;
comparing means for comparing the plurality of modeled robot motion patterns stored in the storing means with the motion pattern acquired by the motion pattern acquiring means to provide a best match from said storing means;
selecting means for selecting, based on the best match of the comparing means, a stored robot motion pattern to be generated; and
error calculating means for determining a linear transformation from the modeled robot motion patterns stored in the storing means to the motion pattern acquired by the motion pattern acquiring means based on errors between the modeled robot motion patterns and the acquired motion pattern,
wherein the comparing means performs the comparison based on the linear transformation determined by the error calculating means.

2. An information processing apparatus comprising:
modeling means for modeling a robot motion pattern executable on a robot control device in a reproducible dynamic form;
storing means for storing a plurality of robot motion patterns that are modeled by the modeling means;
motion pattern acquiring means for acquiring a motion pattern of an object, wherein the object is intended to be performed by the robot control device;
comparing means for comparing the plurality of modeled robot motion patterns stored in the storing means with the motion pattern acquired by the motion pattern acquiring means to provide a best match from said storing means; and
selecting means for selecting, based on the best match of the comparing means, a stored robot motion pattern to be generated;
wherein the modeling means, the storing means, and the comparing means comprise a recurrent neural network.

* * * * *